(12) United States Patent
Feldkamp et al.

(10) Patent No.: US 7,900,509 B2
(45) Date of Patent: Mar. 8, 2011

(54) METHODS FOR VARIABLE DISPLACEMENT ENGINE DIAGNOSTICS

(75) Inventors: Timothy Mark Feldkamp, Ann Arbor, MI (US); Lee Albert Feldkamp, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 12/186,723

(22) Filed: Aug. 6, 2008

(65) Prior Publication Data

US 2010/0031738 A1 Feb. 11, 2010

(51) Int. Cl.
*G01M 15/04* (2006.01)
(52) U.S. Cl. ..................................... 73/114.79
(58) Field of Classification Search ............... 73/114.31, 73/114.79
See application file for complete search history.

(56) References Cited

U.S. PATENT DOCUMENTS

| | | |
|---|---|---|
| 5,331,936 A | 7/1994 | Messih et al. |
| 5,408,966 A | 4/1995 | Lipinski et al. |
| 5,528,929 A | 6/1996 | Ikebuchi |
| 5,721,375 A | 2/1998 | Bidner |
| 5,774,823 A | 6/1998 | James et al. |
| 6,112,149 A | 8/2000 | Varady et al. |
| 6,763,707 B2 | 7/2004 | Kumagai et al. |
| 6,840,233 B2 | 1/2005 | Lingenhult et al. |
| 6,920,851 B2 | 7/2005 | Machida et al. |
| 7,063,057 B1* | 6/2006 | Waters et al. .............. 123/90.16 |
| 7,077,082 B2* | 7/2006 | Bloms et al. .............. 123/90.12 |
| 7,082,924 B1* | 8/2006 | Ruedin .......................... 123/352 |
| 7,171,929 B2* | 2/2007 | Dosdall et al. ............. 123/90.15 |
| 7,204,132 B2* | 4/2007 | Reed et al. .................. 73/114.79 |
| 7,469,672 B2* | 12/2008 | Andri ......................... 123/198 F |
| 7,493,207 B2* | 2/2009 | Yasui et al. .................... 701/103 |
| 7,546,827 B1* | 6/2009 | Wade et al. .................. 123/324 |
| 7,559,309 B2* | 7/2009 | Winstead ................... 123/198 F |
| 7,654,133 B2* | 2/2010 | Hoshi et al. ................ 73/114.32 |
| 2003/0191567 A1* | 10/2003 | Gentilcore ....................... 701/35 |
| 2003/0213445 A1* | 11/2003 | Bloms et al. .............. 123/90.12 |
| 2004/0226539 A1 | 11/2004 | Takahashi et al. |
| 2005/0205048 A1* | 9/2005 | Winstead ................... 123/198 F |
| 2008/0060427 A1* | 3/2008 | Hoshi et al. ................... 73/117.3 |
| 2008/0092836 A1* | 4/2008 | Mutti et al. ................ 123/90.16 |
| 2008/0133177 A1* | 6/2008 | Klenk et al. .................. 702/183 |

* cited by examiner

*Primary Examiner* — Lisa M Caputo
*Assistant Examiner* — Freddie Kirkland, III
(74) *Attorney, Agent, or Firm* — Allan J. Lippa; Alleman Hall McCoy Russell & Tuttle LLP

(57) ABSTRACT

Various methods are described for monitoring cylinder valve deactivation in an engine, the engine including at least a cylinder valve actuator for deactivating at least a cylinder of the engine. One example method comprises indicating degradation of the valve actuator based on crankshaft acceleration.

18 Claims, 8 Drawing Sheets

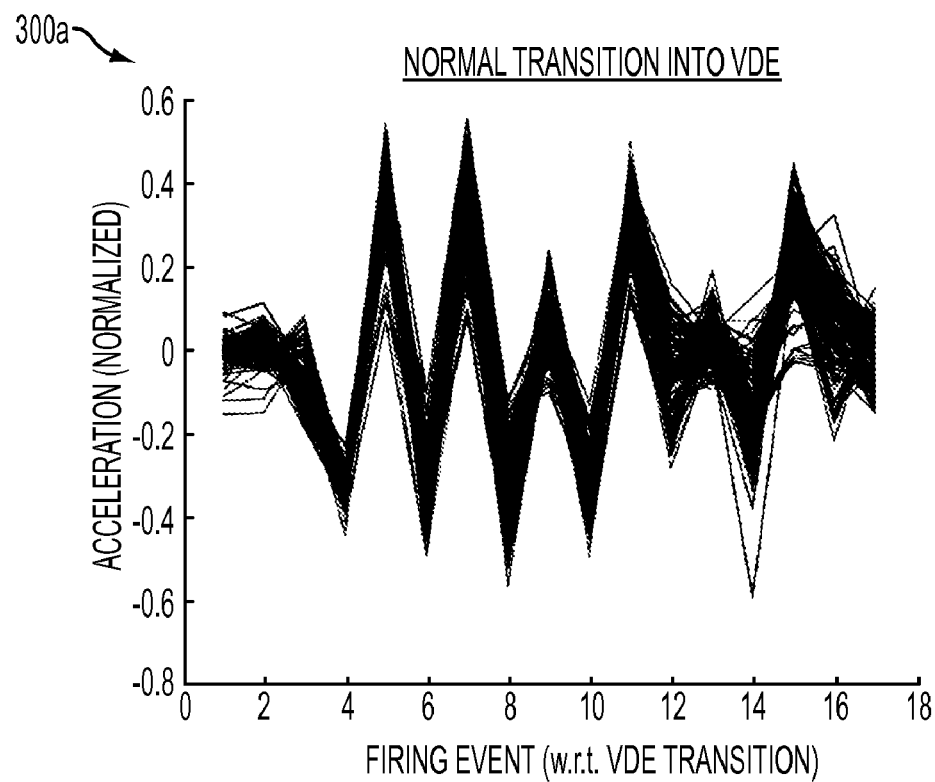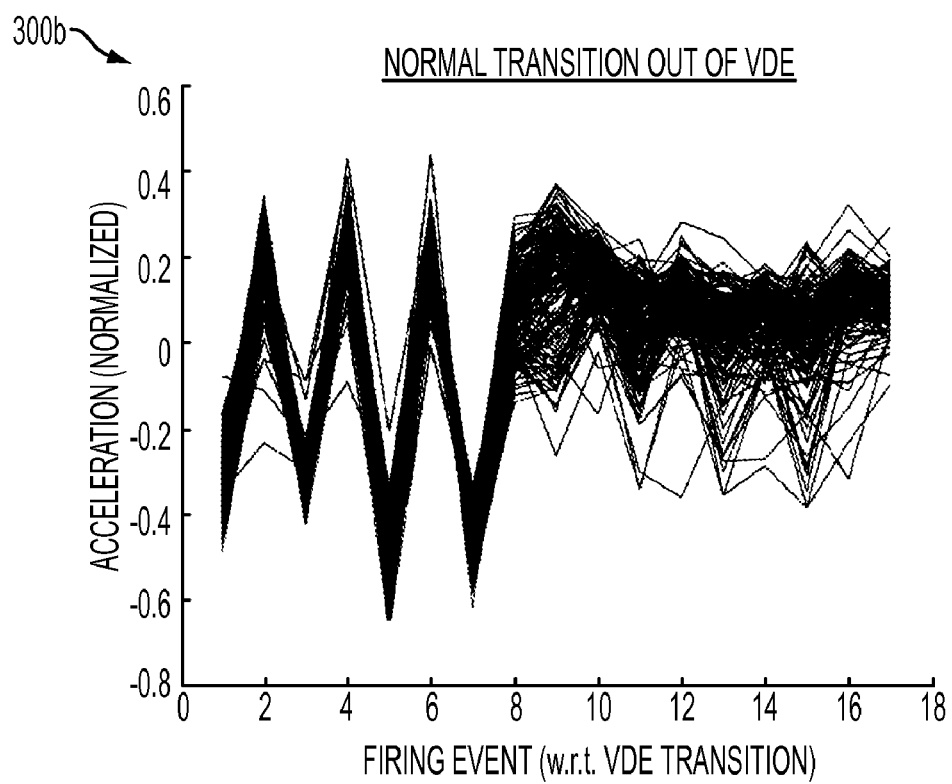
FIG. 3A

500

| Pattern # | Normal / Degraded | Intake / Exhaust Valve Degradation | Single / Multiple Cycle Delay | Degraded Bank = 1st or 2nd bank of Transition | VDE Mode | Neural Network Output # |
|---|---|---|---|---|---|---|
| 1 | N | | | | V4 | 1 |
| 2 | N | | | | V8 | 1 |
| 3 | D | Intake | S | 1st bank | V4 | 2 |
| 4 | D | Intake | S | 1st bank | V8 | 2 |
| 5 | D | Exhaust | S | 1st bank | V4 | 3 |
| 6 | D | Exhaust | S | 1st bank | V8 | 1 |
| 7 | D | Intake | S | 2nd bank | V4 | 4 |
| 8 | D | Intake | S | 2nd bank | V8 | 4 |
| 9 | D | Exhaust | S | 2nd bank | V4 | 5 |
| 10 | D | Exhaust | S | 2nd bank | V8 | 1 |
| 11 | D | Intake | M | 1st bank | V4 | 2 |
| 12 | D | Intake | M | 1st bank | V8 | 2 |
| 13 | D | Exhaust | M | 1st bank | V4 | 3 |
| 14 | D | Exhaust | M | 1st bank | V8 | 3 |
| 15 | D | Intake | M | 2nd bank | V4 | 4 |
| 16 | D | Intake | M | 2nd bank | V8 | 4 |
| 17 | D | Exhaust | M | 2nd bank | V4 | 5 |
| 18 | D | Exhaust | M | 2nd bank | V8 | 5 |

FIG. 5

METHODS FOR VARIABLE DISPLACEMENT ENGINE DIAGNOSTICS

FIELD

The present application relates to methods for monitoring cylinder valve operation in a variable displacement engine (VDE).

BACKGROUND AND SUMMARY

Engines operating with a variable number of active or deactivated cylinders may be used to increase fuel economy, while optionally maintaining the overall exhaust mixture air-fuel ratio about stoichiometry. In some examples, half of an engine's cylinders may be disabled during selected conditions, where the selected conditions can be defined by parameters such as a speed/load window, as well as various other operating conditions including vehicle speed. A VDE controller may disable selected cylinders through the control of a plurality of cylinder valve deactivators that affect the operation of the cylinder's intake and exhaust valves. Diagnostic methods monitor the valve operation for cylinders switching between VDE and non-VDE modes to ensure proper switching.

One example approach for VDE diagnostics is shown by Bidner et al. in U.S. Pat. No. 5,721,375. In this example, degradation in valve deactivation is identified based on the presence of a pressure difference between an expected and an actual cylinder air charge manifold absolute pressure during VDE modes and the absence of such a pressure difference during non-VDE modes of operation. As such, the actual cylinder air charge value is inferred from a measured engine rotational speed, air mass flow, air and coolant temperature, and a determined barometric pressure.

However, the inventors herein have recognized several issues with such an approach. As one example, in an engine with a large number of cylinders (e.g., six, eight or ten), changes in engine airflow and/or manifold pressure reflective of valve degradation in a single cylinder may not be distinguishable from background noise variation in such parameters. In other words, the individual effect of cylinder deactivation on the overall engine airflow or manifold pressure (at a given engine speed) becomes smaller as the total number of cylinders in the engine increases. Therefore, accurate identification of degradation in a single cylinder valve actuator, for example, may be unavailable. Additionally, since degradation of an intake or exhaust valve may affect flow similarly, the above approach may not accurately distinguish the identity of the valve actuator; that is, whether the degradation affects an intake valve or an exhaust valve.

Thus, in one example, the above issues may be addressed by a method of monitoring cylinder valve deactivation in an engine, the engine including at least a cylinder valve actuator for deactivating at least a cylinder of the engine, the method comprised of an indication of a degradation of the valve actuator, based on crankshaft acceleration.

In one example, the engine is an 8-cylinder engine, such as a V8 engine, that can switch between a non-VDE (V8) mode and a VDE (V4) mode of operation. During a non-degraded steady state V8 mode, the crankshaft acceleration values may be centered around zero. If a significant deviation from this normal acceleration pattern is observed, then valve degradation during V8 mode may be identified. During a steady state V4 mode, the firing cylinders may have positive crankshaft acceleration values while the non-firing cylinders may have negative crankshaft acceleration values of the same magnitude. If a significant deviation from this normal acceleration pattern is observed, then valve degradation during V4 operation may be identified. Further, based on the variation in the crankshaft acceleration pattern from the normal acceleration pattern, the type of the valve degradation (e.g., intake/exhaust) may be identified.

In this way, by monitoring engine crankshaft acceleration values and/or acceleration patterns in an engine for several cycles following a transition into, or out of, a VDE mode of operation, degraded valve operations may be detected at an earlier time, and accordingly addressed in a prompt manner.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A-B shows maps illustrating variations in engine acceleration patterns following normal and degraded VDE transitions.

FIG. 5 shows an example lookup table including a range of output result patterns from vector analyses and neural network operations.

DETAILED DESCRIPTION

The following description relates to systems and methods for monitoring and identifying degradation of valve operation for cylinders of an engine operating with variable displacement. As such, the variable displacement engine (VDE) can switch between operation with all cylinders firing or half the cylinders firing by changing the operation of the intake and exhaust valves of selected cylinders. An engine control system monitors variations in crankshaft acceleration signal patterns (such as those illustrated in FIG. 3) to determine whether a VDE valve operation is in a normal or degraded condition. In one described VDE transition diagnostics method, as illustrated in FIG. 4, the crankshaft acceleration values may be used to determine a current characteristic acceleration vector that may then be compared to a database of normal and degraded characteristic acceleration vectors. If a degraded condition is established, the type of degradation may be subsequently identified by comparing the observed pattern to pre-established patterns in a lookup table, as illustrated in FIG. 5. In addition to transition diagnostics, methods for persistent fault diagnostics are described, such as the method illustrated in FIG. 6, wherein it may be determined whether a VDE fault occurs persistently, and the expected duration of the fault. Distinct neural networks may be configured for VDE transition diagnostics (as illustrated in FIG. 7) and persistent fault diagnostic purposes. By identifying and promptly addressing valve operation errors in VDE cylinders, engine drivability issues related to improper valve operation, such as engine misfires, rough engine operation, and audible popping noises, may be reduced.

Figure 1:
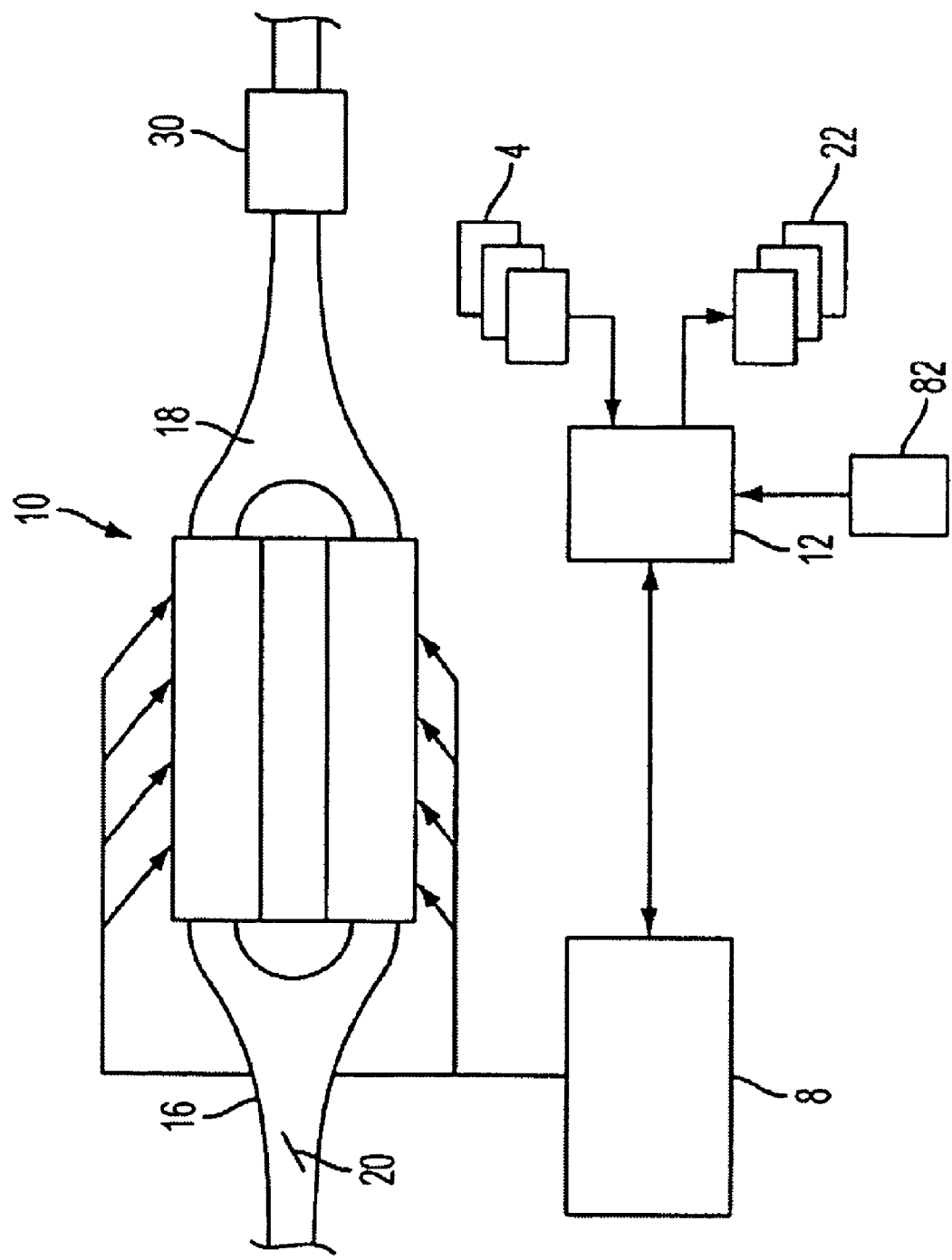
FIG. 1 shows an example engine and exhaust system layout.

FIG. 1 shows an example variable displacement engine (VDE) 10, in which four cylinders (e.g., two in each bank) may have cylinder valves held closed during one or more engine cycles. The cylinder valves may be deactivated via hydraulically actuated lifters coupled to valve pushrods, or via a cam profile switching mechanism in which a cam lobe with no lift is used for deactivated valves. Still other valve deactivation mechanisms may also be used, such as electrically actuated valves. As depicted herein, engine 10 is a V8 engine with two cylinder banks having an intake manifold 16 (with throttle 20) and an exhaust manifold 18 coupled to an emission control system 30 including one or more catalysts and air-fuel ratio sensors.

Engine 10 may operate on a plurality of substances, which may be delivered via fuel system 8. Engine 10 may be controlled at least partially by a control system including controller 12. Controller 12 may receive various signals from sensors 4 coupled to engine 10, and send control signals to various actuators 22 coupled to the engine and/or vehicle. Further, controller 12 may receive an indication of knock from knock sensor 82.

Figure 2:
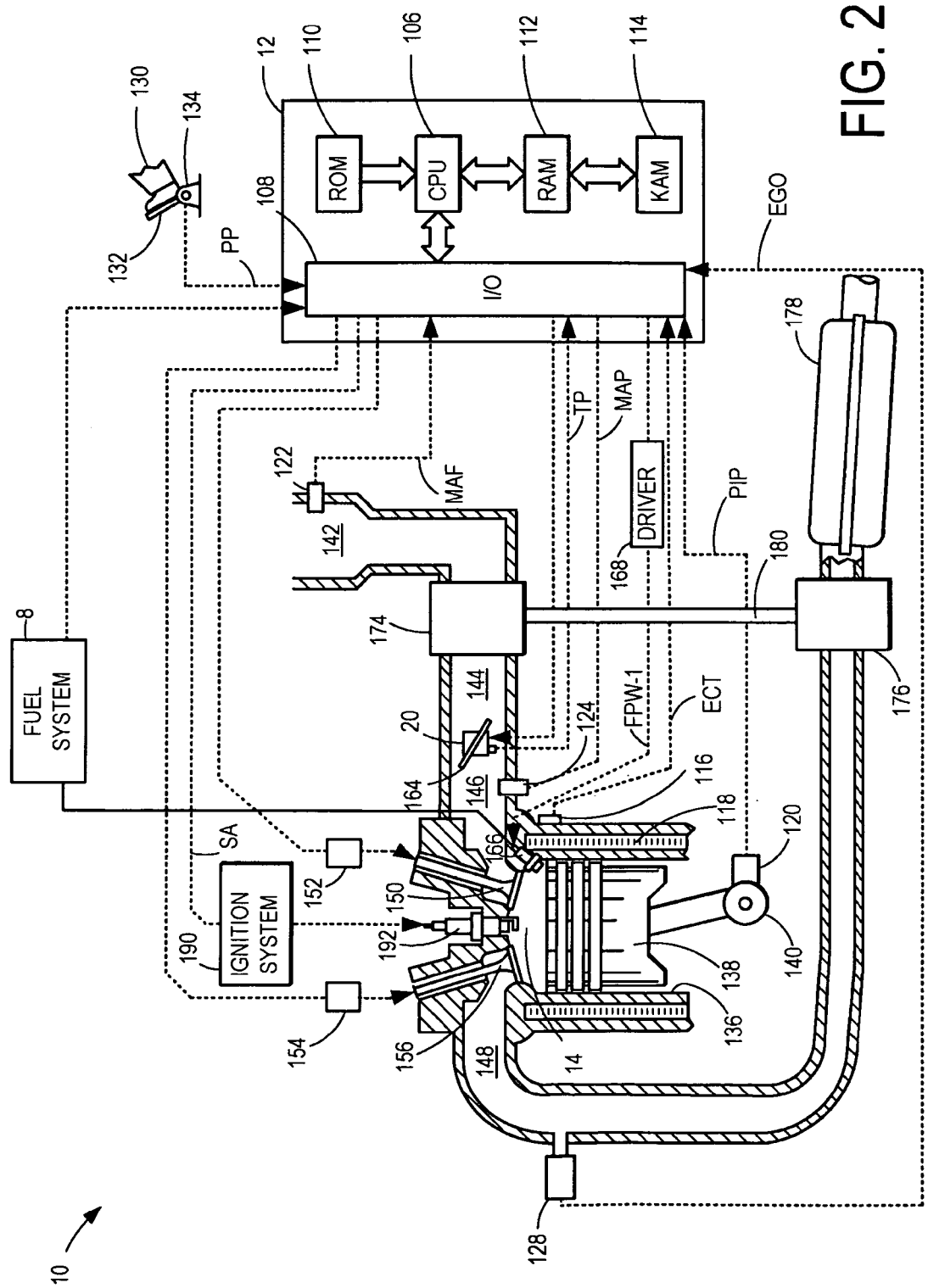
FIG. 2 shows a partial engine view.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder. The valves of deactivatable cylinder 14 may be deactivated via hydraulically actuated lifters coupled to valve pushrods, or via a cam profile switching mechanism in which a cam lobe with no lift is used for deactivated valves. Still other valve deactivation mechanisms may also be used, such as electrically actuated valves. As depicted herein, in one embodiment, deactivation of intake valve 150 may be controlled by VDE actuator 152 while deactivation of exhaust valve 156 may be controlled by VDE actuator 154. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators. Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel blend via a direct injector; in alternate embodiments, the engine may be operated by using two injectors and varying a relative amount of injection from each injector.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Further, crankshaft position, as well as crankshaft acceleration, and crankshaft oscillations may also be identified based on the signal PIP. Manifold pressure signal MAP from a manifold pressure sensor may be used to provide an indication of vacuum, or pressure, in the intake manifold.

Figure 6:
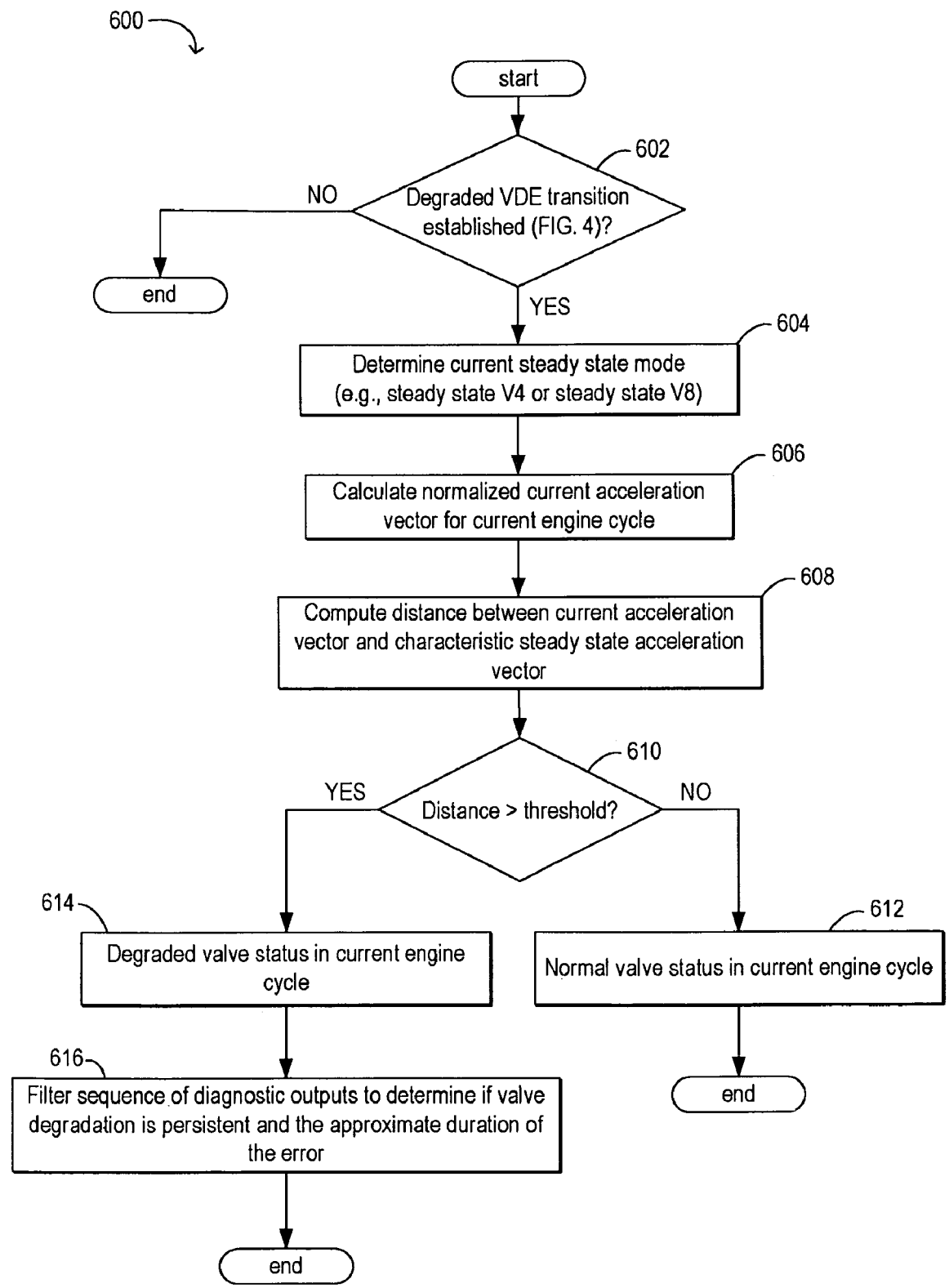
FIG. 6 shows a high level flow chart for a VDE persistent fault diagnostics strategy.
Figure 7:
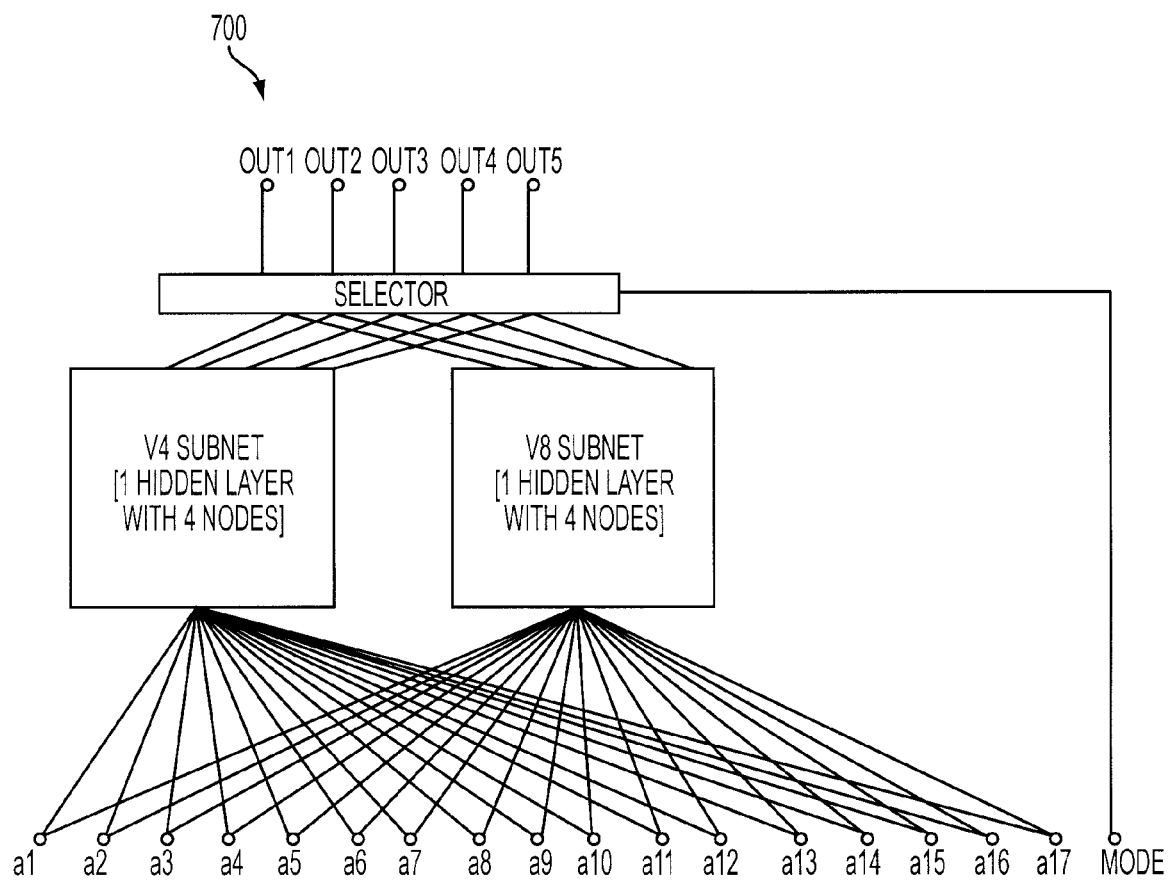
FIG. 7 shows an example neural network that may be employed for VDE transition diagnostics.

Controller 12 may be configured to use the crankshaft acceleration signal from the PIP signal together with information regarding the intended VDE mode (for example transition into VDE, transition out of VDE, steady state VDE, or steady state non-VDE) as inputs to perform a transition diagnostics routine, for example routine 400 of FIG. 4, or a persistent fault diagnostics routine, for example routine 600 of FIG. 6. In the former routine (routine 400), it is determined whether VDE valve operation is in a normal or degraded condition during a transition between VDE and non-VDE modes. In the latter (routine 600), performed only upon the prior establishment of a degraded VDE transition, it is determined whether the valve degradation has persisted into the steady state operation of the engine following the transition.

In either routine, following a transition between operating modes of the VDE, engine crankshaft acceleration values are measured for a plurality of firing events or cycles and processed to establish a current crankshaft acceleration pattern based on the measured crankshaft acceleration of the plurality of firing events. The current crankshaft acceleration pattern may be established by processing a crankshaft acceleration vector. The operational status of the valves may be inferred upon comparing the current crankshaft pattern with a database of predefined "normal" and "degraded" crankshaft acceleration patterns. Comparing the patterns may include computing a distance between a first vector associated with the current crankshaft pattern with a second vector associated with the predefined normal and degraded crankshaft acceleration patterns. In the event that a valve degradation is identified during transition diagnostics, the current acceleration vector is more closely compared to each of a plurality of "degraded" acceleration vectors to identify the degradation type.

As such, the pattern of engine acceleration values during the first few cycles following a VDE transition appear starkly different from those during steady state operation in VDE or non-VDE mode. Thus, if there is a valve degradation during the transition period, the pattern of acceleration values will be dictated by the type of degradation. Given that the acceleration values for normal steady state VDE or non-VDE modes of operation also have distinct patterns, the presence of a persistent degradation during a steady state engine operation will also be reflected by a significant deviation from the normal acceleration pattern. In alternative transition and/or persistent degradation diagnostics approaches, as shown in FIG. 7, the crankshaft acceleration values may be fed into customized neural networks, the outputs of which may determine the presence or absence of a degraded condition, and further the identity and duration of the degradation.

Figure 3B:
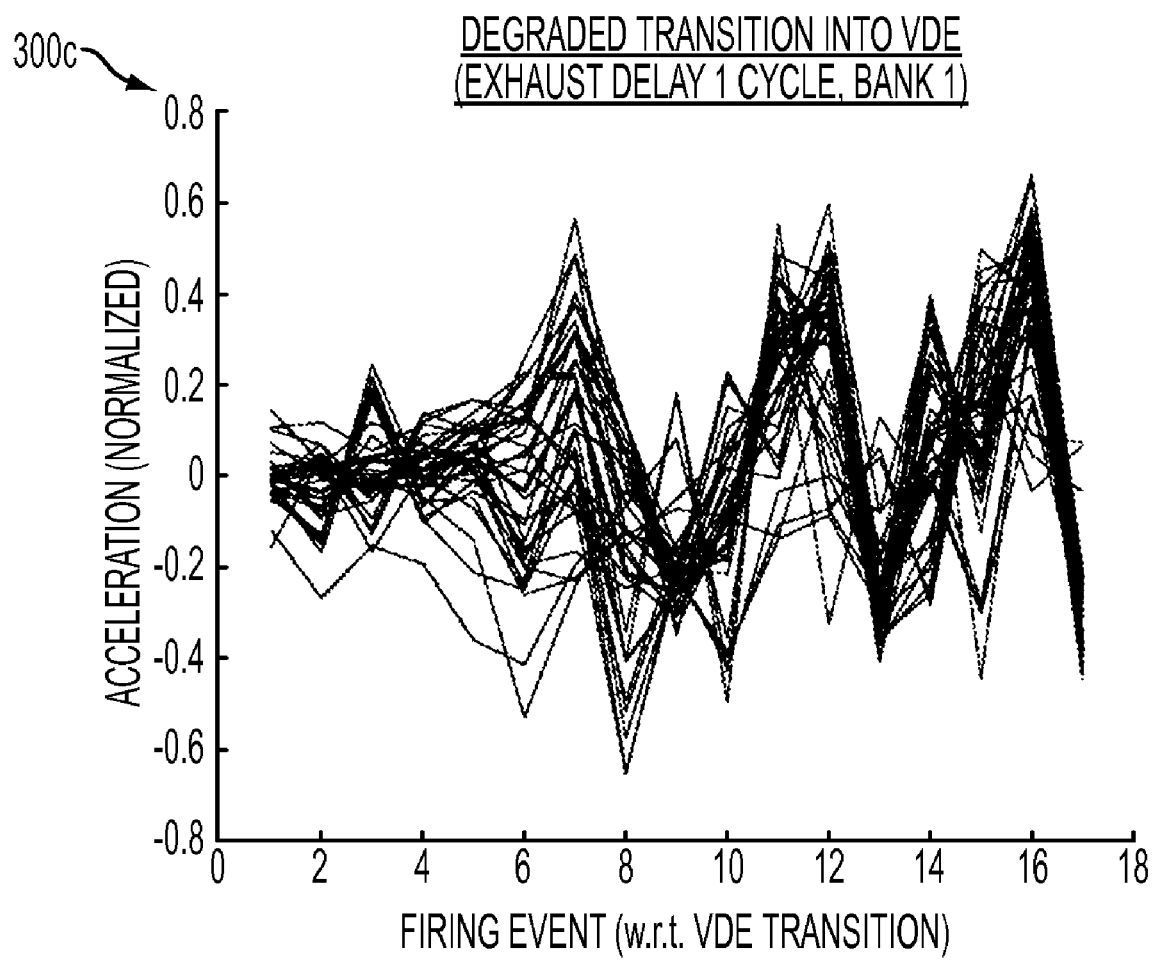
Figure 4:
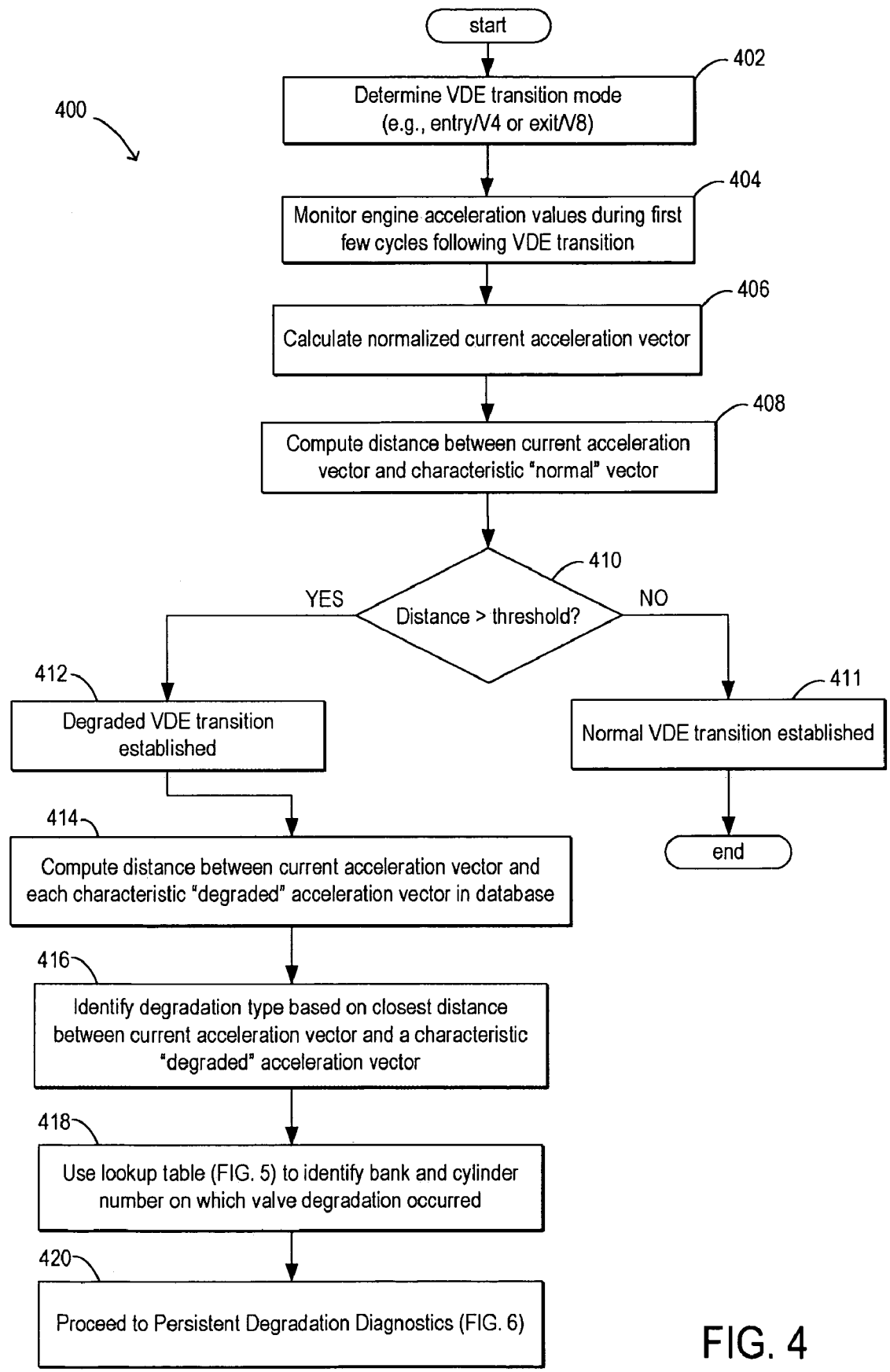
FIG. 4 shows a high level flow chart for a VDE transition diagnostics strategy.

FIG. 3 illustrates example engine acceleration patterns during normal and degraded VDE transitions for a VDE engine operating with 8 cylinders on two banks (4 cylinders on each bank). The engine may switch operation between a V8 mode (or non-VDE mode), with all 8 cylinders firing, or a V4 mode (or VDE mode), with only 4 cylinders firing (2 firing cylinders on each bank). When transitioning into the V4 mode, the intake valves of the VDE cylinders close on the first firing event of the transition. One engine cycle later, the exhaust valves of the VDE cylinders are closed. The valves of the VDE cylinders may remain closed thereafter until the engine transitions into a V8 mode. During the transition into V8 mode, the exhaust valves may be returned to their original V8 operation on the first firing event of the transition while the intake valves may be returned to their typical V8 operation one engine cycle later. It will be appreciated that the pattern of engine acceleration values will appear to repeat each engine cycle after several engine cycles following a VDE transition. As such, for a transition diagnostic purpose, the acceleration patterns during the first few cycles following a transition may be monitored, while for a persistent degradation diagnostic purpose, the acceleration patterns during steady state operation several cycles after a transition may be monitored.

Map 300a depicts engine acceleration patterns following a normal transition into the VDE mode, that is, acceleration patterns in a now steady state V4 mode. Herein, the firing cylinders have positive acceleration values while the non-firing cylinders have negative acceleration values of the same magnitude. The alternating firing pattern between firing and non-firing cylinders in the V4 mode is reflected in the resultant oscillating acceleration pattern. Map 300b depicts engine acceleration patterns following a normal transition out of the VDE mode, that is, acceleration patterns in a now steady state V8 mode. Herein, the acceleration values may tend to center around zero.

For calibration purposes, the acceleration values from each engine firing event of an entire engine cycle (for example 8 events for a V8 engine) may be normalized and then used to determine a normal characteristic steady state acceleration vector for the prevalent steady state mode (V4 or V8). As such, steady state operation begins at several engine cycles beyond a previous VDE transition and ends at the onset of a new VDE transition. In one example, the characteristic steady state acceleration vector associated with normal steady state V8 operation may be set to a zero vector of dimension 8. In contrast, the characteristic steady state acceleration vector associated with normal steady state V4 operation may be normalized to length 1. Alternatively, it may be scaled with the inverse of engine air charge or engine load.

The acceleration values from each engine firing event during the first few engine cycles following a transition may also be used to calibrate and compute a characteristic acceleration pattern vector corresponding to a normal VDE transition. In one example, the characteristic acceleration pattern vector may be based on the acceleration values of 17 events following a VDE transition. The sequence of acceleration values may be normalized as a vector of dimension 17. The arithmetic mean of the collection of normalized vectors may then be used to form the reference characteristic "normal" vectors for either a normal entry into VDE mode or a normal exit from VDE mode. The collection of calibrated characteristic acceleration vectors corresponding to the normal steady states and normal transitions may be compiled in a vector database of the engine controller.

A valve degradation during the transition period may be perceived by a change in the acceleration pattern. In one example, map 300c depicts a degraded VDE transition wherein the closing of exhaust valves in bank 1 are delayed by one cycle. Each distinct type of degradation may be represented by distinct variations in engine acceleration patterns. In one example, during testing of the vehicle, distinct types of valve degradations may be introduced, and a sequence of acceleration values for each degradation type may be acquired and normalized. The arithmetic mean of the collection of normalized vectors associated with each individual degradation type may then be used to form the characteristic acceleration vector for each degradation type. The collection of characteristic acceleration patterns may also be updated in the vector database. Acceleration patterns may be further categorized based on the different types of degradations, such as for example, single-cylinder valve degradations, multiple-cylinder valve degradations, etc. Further, as additional degradation types are identified, their acceleration patterns may be noted and the associated characteristic acceleration vectors updated into the vector database. In this way, cylinder valve deactivation may be monitored to generate a map indicating degradation of the valve actuator based on crankshaft acceleration.

FIG. 4 depicts a transition diagnostics routine 400 that may be performed by controller 12 to identify a valve operation failure. Herein, cylinder valve deactivation may be monitored following a transition between an activated and a deactivated mode of cylinder operation. At 402, the engine VDE transition mode may be determined. In one example, the engine may be entering a VDE transition and consequently may be in a transition entry mode. In another example, the engine may be exiting a VDE transition and consequently may be in a transition exit mode.

At 404, the engine acceleration values during the first few cycles following the VDE transition may be monitored such that an indication of an acceptable operation (e.g., normal operation) or degradation of the valve actuator may be based on crankshaft acceleration of a plurality of firing events. In one example, the engine acceleration values during 17 firing events following the VDE transition may be processed. In another example, the plurality of events includes firing events during one complete engine cycle. At 406, the acceleration values may be normalized to generate a normalized "current acceleration vector". It will be appreciated that a normalized current acceleration vector may be calculated once per each VDE transition. Subsequently, at 408, the current acceleration vector may be compared to the characteristic "normal" vector for the current transition mode. If the current transition mode, as determined at 402, is entry into VDE, then the current acceleration vector may be compared to the characteristic vector for a normal entry. If the current transition mode, as determined at 402, is exit from VDE, then the current acceleration vector may be compared to the characteristic vector for a normal exit. The comparison method may include computation of a distance between the current acceleration vector and the characteristic normal vector. The distance may be computed as a root mean square deviation or mean square deviation, or other appropriate statistical deviation calculator.

At 410, the computed distance between the vectors may be compared to a predetermined threshold value. If the distance is within the threshold value, that is, if the current acceleration vector is very close to the relevant characteristic normal vector, then at 411, a normal VDE transition may be concluded. If, however, the distance is greater than the predetermined threshold, then at 412, a degraded VDE transition may be concluded.

If a degraded VDE transition is established at 412, then at 414, towards the identification of the fault type, the current acceleration vector may be compared to the vector database comprising characteristic acceleration vectors for each of a plurality of fault types. The current acceleration vector may be compared to each of the characteristic "degraded" acceleration vectors by computing a distance between the vectors using statistical deviation calculations such as a root mean square deviation or a mean square deviation. At 416, the final determination of the degradation type may be based upon the closest distance between the current acceleration vector and one of the characteristic "degraded" acceleration vectors in the database.

It will be appreciated that while in this example, at 408 and 414, the comparison method involves statistical computation of a distance between the acceleration vectors, in alternate embodiments, the comparison method may include computation of a dot product between the vectors. Therein, the determination of a normal versus a degraded VDE transition or identification of a degradation type may be based upon a predetermined dot product threshold value. As such, a larger positive dot product between the vectors may indicate an affirmative result. Additional alternative comparison methods may be employed in still other embodiments.

Once the degradation type has been established, at 418, the routine proceeds to identify the bank (when the engine includes at least two banks of cylinders), cylinder and valve-type (intake vs. exhaust) of the degradation based on the crankshaft acceleration pattern. In one example, the range of degraded acceleration patterns obtainable (as compiled in the vector database) may be tabulated into a lookup table, such as Table 500 in FIG. 5, alongside the details pertaining to the degraded bank, VDE mode, identity of the valve (intake or exhaust), type of cycle delay, and the like. Thus, at 418, based on the best match attained, the bank and cylinder number on which the degradation occurred may be determined. In one example, the first intended VDE bank is the first bank (also coded as VDE bank=0), the VDE mode is entry into VDE (also coded as VDE mode=V4), and the best match between the current acceleration vector and the collection of degraded transition vectors is pattern #5. As determined from lookup table 500, this may correspond to an exhaust valve degradation on cylinders 2 and 3 of the first bank of the engine. In this way, cylinder valve deactivation may be identified in an engine including a plurality of cylinders, a first valve actuator for deactivating an intake valve for at least one of the plurality of cylinders and a second valve actuator for deactivating an exhaust valve for at least one of the plurality of cylinders by monitoring crankshaft acceleration to identify degradation in valve deactivation and by identifying whether the degradation includes at least degradation of the first or second actuator based on the monitored crankshaft acceleration.

At 420, the routine proceeds towards a persistent degradation diagnostic routine, as further elaborated in FIG. 6, to determine whether the VDE valve error is occurring in a persistent fashion and continuing into the steady state operation following the transition. If the error is persistent, the persistent degradation diagnostic routine may also be used to measure or estimate the duration of the VDE degradation. Herein, cylinder valve deactivation may be monitored during a steady state of operation following a transition between activated and deactivated modes of cylinder operation. Monitoring may continue for the plurality of events over one engine cycle. As such, the persistent fault diagnostic routine 600 may be executed only if the transition diagnostic routine 400 has indicated an error in the most recent VDE transition, as may be verified at 602.

At 604, the current engine steady state mode may be determined. In one example, the engine may have 8 cylinders and may be operating in either a steady state V4 mode or V8 mode. Accordingly, a characteristic acceleration vector for normal steady state V4 or V8 operation may be computed, as previously elaborated with respect to maps 300a-b in FIG. 3.

At 606, a normalized current acceleration vector may be calculated for the current engine cycle. At 608, the current acceleration vector may be compared to the normal vector for the current steady state mode. Given that the VDE mode is previously established, at 604, only patterns associated with the same VDE mode may be compared to the current acceleration vector. The comparison method may include computation of the distance between the vectors, as previously elaborated in transition diagnostics routine 400. The distance may be compared against a predetermined threshold at 610. If the distance is not greater than the predetermined threshold, then at 612, a normal valve status in the current engine cycle may be concluded. However, if the distance is greater than the predetermined threshold, then at 614, a degraded valve status in the current engine cycle may be concluded. Once the degradation status has been determined, an additional filtering stage may be performed, at 616, on the sequence of diagnostic outputs over a plurality of engine cycles. In one example, filtering may include the use of an exponentially weighted moving average (EWMA) filter, together with initialization logic and predetermined diagnostic thresholds, to initialize filter parameters following each VDE transition. The filtering stage may allow the routine to determine whether the valve error is persistent and further to measure and/or estimate the duration of the degradation.

It will be appreciated that while in the described embodiments, the routines 400 and 600 pertaining to transition and persistent degradation diagnostics identify degradation on the basis of crankshaft acceleration data, in alternate embodiments, the diagnostics may be based on alternate engine operating parameters, including, but not limited to, engine speed, manifold air pressure, crankshaft acceleration, air charge and combinations thereof. For example, during a first condition, indicating degradation of the valve actuator may be based on crankshaft acceleration, whereas during a second condition, indicating degradation of the valve actuator may be based on at least one engine parameter. For example, the engine parameter may be selected from the group consisting of manifold pressure, engine speed, crankshaft acceleration, and aircharge. For engines with a large number of cylinders (such as six, eight, ten or more), however, crankshaft acceleration may be desirable given that the signal to noise ratio for single cylinder deactivation/degradation events may be significantly more pronounced when using crankshaft acceleration data than, for example, engine speed data.

In another aspect of the disclosed methods for VDE transition and persistent degradation diagnostics, artificial neural networks may be employed to identify valve degradations during VDE transitions and also to determine if the valve degradation is persisting into the steady state of engine operation following the transition.

FIG. 7 depicts an example neural network (Map 700) that may be used as an alternate transition diagnostics routine to identify valve errors during VDE transition and further to identify the bank and cylinder harboring the degraded valve. The results of neural network 700 may also be compiled into a lookup table, as depicted herein combined with the results of routine 400 in lookup table 500.

In one desirable configuration, as illustrated in Map 700, the neural network structure may have 18 inputs corresponding to the 17 acceleration values recorded at the beginning of the intended VDE transition firing event plus one input for the VDE mode. The neural network may be configured to generate 5 possible outputs. The internal substructure of the neural network may consist of two main sub-networks and one selection sub-network. Each of the main sub-networks may include a hidden layer with 4 nodes each. One of the main sub-networks (the "V4 subnet") may be dedicated to transitions into the VDE (or V4) mode while the other (the "V8 subnet") may be dedicated to transitions out of the VDE (or into V8) mode. It will be appreciated that both main sub-networks may be multi-layer perceptrons. The selection sub-network, or "selector", may take the outputs from the two main sub-networks and select the output appropriate for the current VDE mode. As such, the entire network may be a feed-forward network executed once per VDE transition.

At a1-a17 of the neural network in Map 700, the acceleration values for 17 firing events following the VDE transition may be input. Each original acceleration value may be scaled to either a [+1] or a [−1] input based on whether the acceleration value is positive (for firing cylinders) or negative (for non-firing cylinders). The mode may be input as [+1] for an entry into VDE, also corresponding to a V4 mode, or as [−1] for an exit out of VDE, also corresponding to a V8 mode. Following execution of the neural network, the results may be assembled into a table, such as Table 500, wherein the degradation state and the degradation identity may be evaluated. Output 1 may be dedicated to the patterns corresponding to "normal" VDE transitions. The value for Output 1 may be compared to a predetermined threshold and if the value is greater than the threshold, the transition may be declared "normal" while if the value is below the threshold, the transition may be declared "degraded". In one example, the threshold is zero, and a value of Output 1 corresponding to 1.0 correlates to a "normal" transition while a value of −1.0 correlates to a "degraded" transition. It will be appreciated that if Output 1 is 1.0, and a normal transition is established, then examination of the other network outputs may not be required.

If Output 1 is below the threshold, then the values of Outputs 2-5 may be studied. Each of Outputs 2-5 may correspond to a distinct degradation type. An output value close to 1.0 on any of these outputs may imply that the degraded transition type closely matches that particular degradation pattern. An output value close to −1.0 may imply that the transition type does not match that particular degradation pattern. If exactly one of Outputs 2-5 exceeds the threshold, then the identity of the degradation corresponds to that output number. If none of the values exceeds the threshold, or if more than one output value exceeds the threshold, then the identity of the degradation type may be considered inconclusive and, as such, may be ignored for that transition event.

Once the degradation type has been determined, the neural network data may be further processed to determine the bank and cylinder number on which the degradation has occurred. 18 possible patterns for an example V8 VDE engine (with 2 banks of 4 cylinders each) are represented in Table 500. In one example, if the first intended VDE bank is Bank 1, and the VDE mode corresponds to V4 mode, and output 3 is close to 1.0, then it may be concluded that an exhaust valve degradation on Bank 1 corresponding to cylinders 2 and 3 may exist.

It will be appreciated that prior to use, the neural network may be trained to give the desired outputs. The training data may cover the entire operating range of conditions and may include details pertaining to both normal and degraded VDE transitions. During vehicle data collection for training purposes, each degradation type may be induced, for example by altering engine operating parameters in the engine controller. In one example, the correct valve actuation time may be delayed by a known number of engine cycles to simulate delayed or degraded hydraulic actuation of the valve. Data may be collected over many engine operating conditions for valve errors on each bank, in each VDE mode, with delays over a wide range of cycles (such as 1-20 cycles), and stored in a database.

It will also be appreciated that while each unique degradation type may be given its own output, multiple acceleration patterns may be similar and thus may be grouped together into a smaller number of network outputs. In one example, the acceleration values for 1-cycle delayed exhaust valve operations during the V8 mode may not be distinguishable from a normal transition into the V8 mode. As such, improved overall performance may be achieved by grouping those degradations with the normal (Output 1) class in the training data. It will also be appreciated that the grouping of acceleration patterns may be different for different engines. Further, the hidden weights of the two main sub-networks may be trainable weights. During the training process, the value of the selected VDE mode may direct the training effort to the appropriate sub-network for each transition.

Neural networks may also be used as an alternate method for persistent degradation diagnostics. Herein, a neural network may be employed to determine if the VDE valve error is occurring in a persistent fashion, and if so, the duration of the VDE error may also be measured. The configuration of the neural network used for the persistent degradation diagnostic routine may be different from that illustrated in FIG. 7 and used specifically for the transition diagnostics routine. In one desirable configuration for persistent degradation diagnostics, the neural network may receive 5 inputs corresponding to the acceleration pattern for the current firing, the engine speed in rpm, the engine load (or an engine air charge value), a cylinder identification value, and the VDE mode. Further, the internal structure of the neural network may consist of two fully recurrent hidden layers with 9 nodes and 5 nodes, respectively. It will be appreciated that the entire neural network may be executed once per firing event.

Following network execution, only one output may be generated to evaluate the degraded state. The output may be compared to a predetermined threshold, for example a zero threshold. If the output exceeds the threshold, then the firing event may be declared persistently degraded. If not, the firing event may be declared normal. Once the degraded status for the current firing event is determined, an additional filtering stage may be performed on the sequence of diagnostic outputs over many engine cycles to determine whether the degradation is persistent and to calculate the approximate duration of the degradation. Filtering may include the use of a EWMA filter, together with initialization logic to initialize filter parameters following each VDE transition and predetermined diagnostic thresholds.

In this way, valve operation in a VDE engine may be monitored and valve errors may be promptly identified. By identifying the presence and exact identity of valve degradations that occur during a VDE transition, as well as valve errors that continue during steady state engine operation, valve troubles may be addressed at an earlier time and degraded engine performance associated with valve degradation may be prevented. Further, by using prevalent crankshaft acceleration data as input for the diagnostics, the need for ancillary valve degradation detection hardware may be avoided. While in the depicted routines crankshaft acceleration data is used to identify VDE errors, it will be appreciated that in alternate embodiments of the diagnostics routines, crankshaft speed or alternate engine operating parameters may optionally or additionally be used to identify VDE valve degradation. As such, in engines with a large number of cylinders, crankshaft acceleration data may be preferred over crankshaft speed data due to the small effect of individual cylinder deactivation on the overall engine airflow or manifold pressure (at a given engine speed). In contrast, for the same individual cylinder deactivation in the same multi-cylinder engine configuration, the crankshaft acceleration signal may generate the most distinct signal.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method for monitoring cylinder valve deactivation in an engine, comprising:
   detecting a change in engine displacement;
   establishing a current crankshaft acceleration pattern by processing a crankshaft acceleration vector in response to the change in engine displacement;
   comparing the current crankshaft acceleration pattern with a predefined normal crankshaft acceleration pattern and a predefined degraded crankshaft acceleration pattern; and
   indicating degradation of a cylinder valve actuator based on said comparison.

2. The method of claim 1 wherein monitoring cylinder valve deactivation includes monitoring cylinder valve deactivation following a transition between an activated and a deactivated mode of cylinder operation.

3. The method of claim 1 wherein indicating degradation of the cylinder valve actuator based on said comparison includes indicating degradation of the cylinder valve actuator based on crankshaft acceleration of a plurality of firing events.

4. The method of claim 3 wherein the plurality of firing events includes firing events during one complete engine cycle.

5. The method of claim 1 wherein the cylinder valve actuator includes a cylinder valve actuator that deactivates a plurality of cylinders.

6. The method of claim 1 where the engine includes 6 or more cylinders.

7. The method of claim 1 where the engine includes 8 or more cylinders.

8. The method of claim 3 wherein a crankshaft acceleration pattern over the plurality of firing events further identifies whether an actuator for an intake valve, an exhaust valve, or both, is degraded.

9. The method of claim 8 further comprising monitoring cylinder valve deactivation during a steady state of engine operation, the steady state of engine operation following a transition between activated and deactivated modes of cylinder operation.

10. The method of claim 9 wherein monitoring cylinder valve deactivation during the steady state of engine operation includes monitoring for the plurality of firing events over one complete engine cycle.

11. A method for monitoring cylinder valve deactivation in an engine, comprising:
   recording at least an engine operating parameter and processing the at least an engine operating parameter by a neural network that has at least one sub-network for each cylinder operating mode;
   during a first condition, indicating degradation of a cylinder valve actuator based on crankshaft acceleration processed by said neural network; and
   during a second condition, indicating degradation of the cylinder valve actuator based on manifold air pressure processed by said neural network.

12. The method of claim 11 wherein the engine operating parameter is selected from a group consisting of engine speed, manifold air pressure, crankshaft acceleration, and air charge.

13. A method for monitoring cylinder valve deactivation in an engine, the engine including a plurality of cylinders, a first valve actuator for deactivating an intake valve for at least one of the plurality of cylinders and a second valve actuator for deactivating an exhaust valve for at least one of the plurality of cylinders, the method comprising:
   monitoring crankshaft acceleration to identify degradation in valve deactivation;
   creating a crankshaft acceleration vector from said monitoring of said crankshaft acceleration and establishing a current crankshaft acceleration pattern;
   comparing the current crankshaft acceleration pattern with a predefined normal crankshaft acceleration pattern and a predefined degraded crankshaft acceleration pattern; and
   identifying whether the degradation includes at least degradation of the first or second valve actuator based on the monitored crankshaft acceleration.

14. The method of claim 13, where the engine includes at least two banks of cylinders, the method further comprising:
   when degradation is identified,
   identifying a bank, and a valve type, based on the current crankshaft acceleration pattern.

15. A method for detecting an operational status of a plurality of valves in a variable displacement engine, comprising:
   following a transition between operating modes of the variable displacement engine;
   measuring an engine crankshaft acceleration value for a plurality of firing events;
   establishing a current crankshaft acceleration pattern based on measured crankshaft acceleration of the plurality of firing events, including processing a crankshaft acceleration vector; and
   inferring the operational status of the plurality of valves responsive to the established current crankshaft acceleration pattern, including comparing the current crankshaft acceleration pattern with predefined normal and predefined degraded crankshaft acceleration patterns.

16. The method of claim 15 wherein comparing the current crankshaft acceleration pattern with the predefined normal and predefined degraded crankshaft acceleration patterns includes computing a dot product between a normal crankshaft acceleration vector and a current crankshaft acceleration vector.

17. The method of claim 16 wherein comparing the current crankshaft acceleration pattern with the predefined normal and predefined degraded crankshaft acceleration patterns includes determining a root-mean-square deviation between the current crankshaft acceleration pattern and the predefined normal and predefined degraded crankshaft acceleration patterns.

18. The method of claim 17 wherein comparing the current crankshaft acceleration pattern with the predefined normal and predefined degraded crankshaft acceleration patterns includes computing a distance between a first vector associated with the current crankshaft acceleration pattern and a second vector associated with the predefined normal and predefined degraded crankshaft acceleration patterns.

* * * * *